(12) United States Patent
Norrie

(10) Patent No.: US 6,236,501 B1
(45) Date of Patent: May 22, 2001

(54) THREE ELEMENT OBJECTIVE LENS SYSTEM USING GERMANIUM LENS ELEMENT

(75) Inventor: David Gordon Norrie, Denbigh (GB)

(73) Assignee: Pilkington PE Limited, Denbighshire (GB)

( * ) Notice: Subject to any disclaimer, the term of this patent is extended or adjusted under 35 U.S.C. 154(b) by 0 days.

(21) Appl. No.: 09/304,495

(22) Filed: May 3, 1999

(30) Foreign Application Priority Data

May 8, 1998 (GB) .................................................. 9809736

(51) Int. Cl.[7] .............................. G02B 1/00; G02B 9/16; G02B 13/14; G02B 13/18
(52) U.S. Cl. ............................................ 359/356; 359/791
(58) Field of Search .................................... 359/355, 356, 359/357, 791

(56) References Cited

U.S. PATENT DOCUMENTS

| | | | |
|---|---|---|---|
| 3,778,133 | * 12/1973 | Tatian | ................................... 359/356 |
| 4,479,695 | 10/1984 | Neil . | |
| 4,685,774 | 8/1987 | Moskovich . | |
| 5,089,828 | * 2/1992 | Moss | ..................................... 343/725 |
| 5,214,532 | 5/1993 | Hall et al. . | |
| 5,251,063 | 10/1993 | Baumann . | |
| 5,446,581 | 8/1995 | Jamieson . | |
| 5,493,441 | 2/1996 | Chipper . | |

* cited by examiner

Primary Examiner—Jon Henry
(74) Attorney, Agent, or Firm—Alston & Bird LLP

(57) ABSTRACT

An objective lens system 10 uses Germanium lens elements including a positively-powered objective lens (A), a positively-powered intermediate lens (B) and a negatively-powered field lens (C). The field lens (C) flattens the Field curvature of the system. The intermediate lens (B) corrects astigmatism and has an aspheric surface (3).

4 Claims, 1 Drawing Sheet

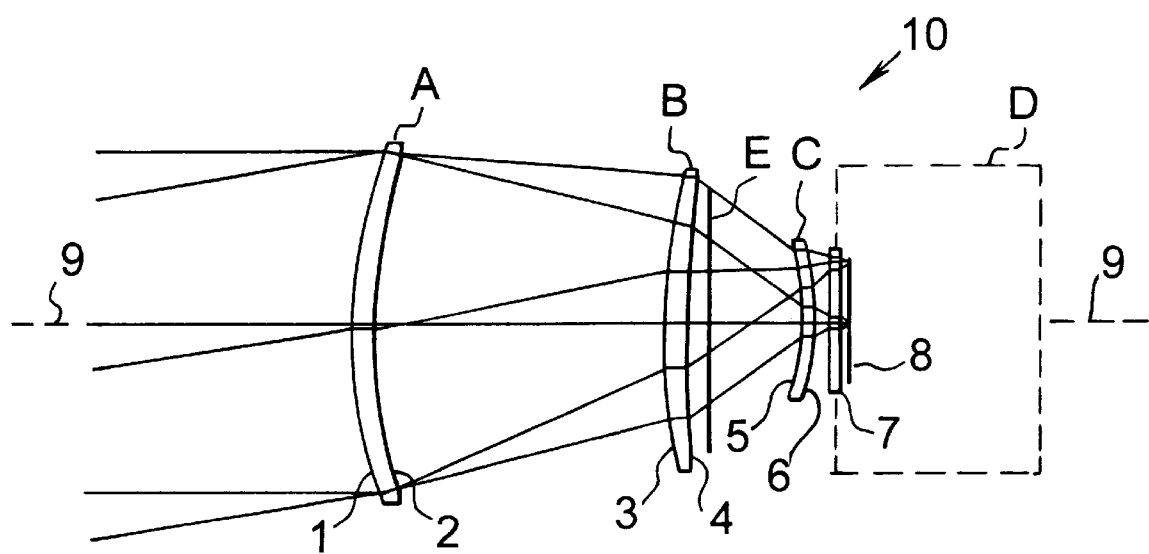

THREE ELEMENT OBJECTIVE LENS SYSTEM USING GERMANIUM LENS ELEMENT

This invention relates to an objective lens system for use in the thermal infra red waveband, particularly in the 8–12 micron waveband with a cooled or uncooled detection system.

According to the present invention there is provided an objective lens system for use with a detection system in the thermal infra red waveband, particularly in the 8–12 micron waveband, said objective lens system being light in weight whilst utilising Germanium lens elements and having high aperture to provide sensitivity, wherein the lens system comprises a single-element positively-powered objective lens, a single element positively-powered intermediate lens, and a single element negatively-powered field lens each mutually spaced apart along a common optical axis, and the field lens is arranged to flatten the field curvature of the lens system whilst the intermediate lens is arranged primarily to correct astigmatism and has an aspheric surface to correct the balance between oblique sagittal, tangential spherical aberration and high order astigmatism.

Preferably the objective lens is shaped to provide coma correction for the lens system, and has an aspheric surface to correct spherical aberration.

By virtue of the present invention each lens element is thin and of low mass despite being made of Germanium.

An embodiment of the present invention will now be described by way of example with reference to the accompanying schematic drawing.

The drawing illustrates an objective lens system 10 for use in the 8–12 micron waveband.

System 10 comprises an objective lens A which is a single lens element made of Germanium and having refractive surfaces 1,2, an intermediate lens B which is a single lens element made of Germanium and having refractive surfaces 3,4, and a field lens C which is a single lens element made of Germanium and having refractive surfaces 5,6. The system 10 is designed for use with a thermal infra red detector system D having a planar window 7 and a detector surface 8 and accordingly forms part of a thermal imaging system. Lenses A,B and C are mutually spaced apart along a common optical axis 9.

Lens A is positively powered and is basically shaped to provide coma correction for the system 10 but its surface 2 is aspheric to correct spherical aberration. Lens B is also positively powered and is basically shaped to provide astigmatism correction but its surface 3 is aspheric to correct the balance between oblique sagittal, tangential spherical aberration and higher order astigmatism. Lens C is negatively powered and is close to the focal plane of the system 10 where detector surface 8 is located, lens C being arranged to flatten the field curvature of the system 10 so that the detector system D provides good imagery which is near diffraction limited over practically the entire area of the detector surface 8.

A signal normalisation shutter E is provided adjacent the lens B.

A particular numerical example of the system 10 is set forth in Table I hereto, where all dimensions are in millimetres; positive radius of curative indicates that the centre of curvature is to the right of the surface; negative radius of curvature indicates that the centre of curvature is to the left of the surface; A(1) and A(2) indicate aspheric surfaces; and 'separation' is the distance from the previous surface in the Table reading from left to right in the drawing.

The system 10 in accordance with Table I has a high aperture, namely F/1, a short focal length of about 52 mm, and provides a 16° by 12° field of view to a detector surface 8 which is about 15 mm by 11 mm. The system has good transmission, of the order of 85% over the waveband of interest and good imagery which is near diffraction limited over practically the entire area of the detector surfaces dropping only to about 60% at 12 c/mm in the corners, and is extremely light in weight at about 70 gm despite use of Germanium throughout.

The system 10 maybe focused and/or athermalised by axial movement of lens B, without movement of lenses A and C. Alternatively lens A or detector D may be moved axially.

TABLE I

| Item | Material | Surface | Radius of Curvature | Separation | Aperture |
|------|----------|---------|---------------------|------------|----------|
| A | Ge | 1 | 74.0 | — | 51.8 |
|   |    | 2 | A (1) | 3.80 | 51.0 |
| B | Ge | 3 | A (2) | 43.4 | 44.0 |
|   |    | 4 | 362.4 | 3.50 | 43.5 |
| C | Ge | 5 | −32.8 | 17.5 | 21.5 |
|   |    | 6 | −43.5 | 1.50 | 22.0 |
| 8 | — | — | ∞ | 4.98 | — |

The aspheric surfaces are defined by the equation:

$$Z = \frac{(curv)Y^2}{1 + \sqrt{(1 - (1+K)(curv)^2 Y^2)}} + \alpha Y^4 + \beta Y^6 + \gamma Y^8$$

where Z=surface sag, curv=radius$^{-1}$, Y is the distance from the surface vertex, and K, $\alpha$, $\beta$, and $\gamma$ are the following coefficients

| Surface | Curv | K | $\alpha$ | $\beta$ | $\gamma$ |
|---------|------|---|----------|---------|----------|
| A (1) | 0.01022181 | 0.0 | 2.04 × 10$^{-7}$ | 1.71 × 10$^{-11}$ | 7.8 × 10$^{-14}$ |
| A (2) | 0.00986193 | 0.0 | 1.71 × 10$^{-7}$ | 2.03 × 10$^{-10}$ | 0.0 |

What is claimed is:

1. An objective lens system for use with a detection system in the 8–12 micron thermal infra red waveband, said objective lens system being light in weight, utilising only three lens elements each of which is made of Germanium, and having high aperture to provide sensitivity at a focal plane of the system, wherein the lens system comprises a single-element positively-powered objective lens (A), a single element positively-powered intermediate lens (B), and a single element negatively-powered field lens (C) which is located close to the focal plane of the system, the lenses being mutually spaced apart along a common optical axis (9), and wherein the field lens (C) is arranged to flatten the field curvature of the lens system, the intermediate lens (B) is arranged to correct astigmatism, and the intermediate lens (B) has an aspheric surface (3) to balance oblique sagittal, tangential spherical aberration and high order astigmatism.

2. An objective lens system as claimed in claim 1, wherein the objective lens (A) is shaped to provide coma correction for the lens system, and the objective lens (A) has an aspheric surface (2) to correct spherical aberration.

3. An objective lens system as claimed in claim 1, in combination with a thermal infra-red detector system (D) having a detector surface (8) located in the focal plane of the lens system.

4. The combination of claim 3 and having the parameters as set forth in Table I, where all dimensions are in millimeters; positive radius of curvature of a surface indicates that the center of curvature is between the surface and the focal plane; negative radius of curvature of a surface indicates that the surface is between the center of curvature and the focal plane; A(1) and A(2) indicate aspheric surfaces; and 'separation' for each surface is the distance between said surface and a surface immediately preceding said surface in Table I, Table I being:

TABLE I

| Element | Surface | Radius of Curvature | Separation | Aperture |
|---|---|---|---|---|
| A | 1 | 74.0 | — | 51.8 |
| A | 2 | A (1) | 3.80 | 51.0 |
| B | 3 | A (2) | 43.4 | 44.0 |
| B | 4 | 362.4 | 3.50 | 43.5 |
| C | 5 | −32.8 | 17.5 | 21.5 |
| C | 6 | −43.5 | 1.50 | 22.0 |
| Detector | 8 | ∞ | 4.98 | — | and wherein the aspheric surfaces A(1) and A(2) are defined by the equation:

$$Z = \frac{(curve)Y^2}{1 + \sqrt{(1 - (1+K)(curv)^2 Y^2)}} + \alpha Y^4 + \beta Y^6 + \gamma Y^8$$

where Z=surface sag, Y is the distance from a vertex of the surface, and curv, K, $\alpha$, $\beta$, and $\gamma$ are as follows:

| Surface | Curv | K | $\alpha$ | $\beta$ | $\gamma$ |
|---|---|---|---|---|---|
| A (1) | 0.01022181 | 0.0 | $2.04 \times 10^{-7}$ | $1.71 \times 10^{-11}$ | $7.8 \times 10^{-14}$ |
| A (2) | 0.00986193 | 0.0 | $1.71 \times 10^{-7}$ | $2.03 \times 10^{-10}$ | 0.0. |

* * * * *